US007632977B2

(12) United States Patent
Mo et al.

(10) Patent No.: US 7,632,977 B2
(45) Date of Patent: *Dec. 15, 2009

(54) METHOD AND APPARATUS FOR MAKING A MIDDLE DISTILLATE PRODUCT AND LOWER OLEFINS FROM A HYDROCARBON FEEDSTOCK (75) Inventors: Weijian Mo, Sugar Land, TX (US);
Georghios Agamemnonons Hadjigeorge, Sugar Land, TX (US);
Frank Hsian Hok Khouw, Voorburg (NL)

(73) Assignee: Shell Oil Company, Houston, TX (US)

( * ) Notice: Subject to any disclaimer, the term of this patent is extended or adjusted under 35 U.S.C. 154(b) by 574 days.

This patent is subject to a terminal disclaimer.

(21) Appl. No.: 11/332,982

(22) Filed: Jan. 17, 2006

(65) Prior Publication Data
US 2006/0178546 A1    Aug. 10, 2006

Related U.S. Application Data (63) Continuation-in-part of application No. 11/199,050, filed on Aug. 8, 2005.

(60) Provisional application No. 60/600,264, filed on Aug. 10, 2004.

(51) Int. Cl.
*C07C 4/02* (2006.01)

(52) U.S. Cl. .................... 585/648; 208/72; 208/77; 208/78; 208/80; 208/120.1; 208/153; 208/161; 208/164; 422/139; 422/147

(58) Field of Classification Search ............... 208/77, 208/78, 80, 120.1, 153, 161, 164, 72; 422/139, 422/147; 585/648
See application file for complete search history.

(56) References Cited

U.S. PATENT DOCUMENTS 3,130,007 A    4/1964    Breck ...................... 23/113

(Continued)

FOREIGN PATENT DOCUMENTS

EP        229295        7/1987

(Continued)

OTHER PUBLICATIONS

International Search Report for PCT/US2005/028053 of Nov. 7, 2005.
Written Opinion for PCT/US2005/028053 of Nov. 7, 2005.
J. Catalysis. 67. 218-222 (1981).
"Atlas of Zeolite Structure Types." Eds. W. H: Meier and D. H. Oson. Butterworth-Heineman. Third Edition 1992.
Jean Seydoux et al, "A Deep Resistivity Logging-While-Drilling Device for Proactive Geosteering", The Leading Edge, Jun. 2004, pp. 581-586.

*Primary Examiner*—In Suk Bullock
*Assistant Examiner*—Prem C. Singh
(74) *Attorney, Agent, or Firm*—William E. Hickman (57) ABSTRACT Disclosed is a process for making middle distillate and lower olefins. The process includes catalytically cracking a gas oil feedstock within a riser reactor zone by contacting under suitable catalytic cracking conditions within the riser reactor zone the gas oil feedstock with a middle distillate selective cracking catalyst that comprises amorphous silica alumina and a zeolite to yield a cracked gas oil product and a spent cracking catalyst. The spent cracking catalyst is regenerated to yield a regenerated cracking catalyst. Within an intermediate cracking reactor such as a dense bed reactor zone and under suitable high severity cracking conditions a gasoline feedstock is contacted with the regenerated cracking catalyst to yield a cracked gasoline product and a used regenerated cracking catalyst. The used regenerated cracking catalyst is utilized as the middle distillate selective catalyst.

12 Claims, 6 Drawing Sheets

U.S. PATENT DOCUMENTS

| | | | | |
|---|---|---|---|---|
| 3,702,886 A | 11/1972 | Argauer et al. | | 423/328 |
| 3,709,979 A | 1/1973 | Woodbury | | 423/328 |
| 3,770,614 A | 11/1973 | Graven | | 208/62 |
| 3,832,449 A | 8/1974 | Rosinski et al. | | 423/328 |
| 3,928,172 A | 12/1975 | Davis, Jr. et al. | | 208/77 |
| 3,948,758 A | 4/1976 | Bonacci et al. | | 208/92 |
| 4,016,245 A | 4/1977 | Plank et al. | | 423/328 |
| 4,051,013 A | 9/1977 | Strother | | 208/78 |
| 4,076,842 A | 2/1978 | Plank et al. | | 423/328 |
| 4,111,793 A | 9/1978 | Kolombos et al. | | 208/121 |
| 4,254,297 A | 3/1981 | Frenken et al. | | 585/640 |
| 4,309,280 A | 1/1982 | Rosinski et al. | | 208/120 |
| 4,310,440 A | 1/1982 | Wilson et al. | | 252/435 |
| 4,368,114 A | 1/1983 | Chester et al. | | 208/120 |
| 4,440,871 A | 4/1984 | Lok et al. | | 502/214 |
| 4,500,651 A | 2/1985 | Lok et al. | | 502/208 |
| 4,711,710 A | 12/1987 | Chen et al. | | 208/111 |
| 4,731,174 A | 3/1988 | Occelli et al. | | 208/120 |
| 4,803,186 A | 2/1989 | Chen et al. | | 502/66 |
| 4,830,728 A | 5/1989 | Herbst et al. | | 208/78 |
| 4,927,523 A | 5/1990 | Donnelly | | 208/113 |
| 4,929,337 A | 5/1990 | Herbst et al. | | 208/120 |
| 4,994,995 A | 2/1991 | Anderson et al. | | 208/152 |
| 5,000,837 A | 3/1991 | Harandi | | 208/67 |
| 5,009,769 A | 4/1991 | Goelzer | | 208/113 |
| 5,055,437 A | 10/1991 | Herbst et al. | | 502/67 |
| 5,156,817 A | 10/1992 | Luckenbach | | 422/144 |
| 5,168,086 A | 12/1992 | Cheng et al. | | 502/66 |
| 5,234,575 A | 8/1993 | Haag et al. | | 208/710 |
| 5,234,578 A | 8/1993 | Stine et al. | | 208/113 |
| 5,318,696 A | 6/1994 | Kowalski | | 208/120 |
| 5,372,704 A | 12/1994 | Harandi et al. | | 208/74 |
| 5,435,906 A | 7/1995 | Johnson et al. | | 208/78 |
| 5,451,313 A | 9/1995 | Wegerer et al. | | 208/164 |
| 5,521,264 A * | 5/1996 | Mehra et al. | | 526/68 |
| 5,547,564 A | 8/1996 | Cheng et al. | | 208/122 |
| 5,565,176 A | 10/1996 | Johnson et al. | | 422/1.44 |
| 5,730,859 A | 3/1998 | Johnson et al. | | 208/78 |
| 5,888,378 A | 3/1999 | Kowalski | | 208/114 |
| 5,944,982 A | 8/1999 | Lomas | | 208/164 |
| 5,965,012 A | 10/1999 | Lomas | | 208/113 |
| 6,106,697 A | 8/2000 | Swan et al. | | 208/77 |
| 6,123,832 A | 9/2000 | Ho et al. | | 208/113 |
| 6,166,282 A | 12/2000 | Miller | | 585/638 |
| 6,258,257 B1 | 7/2001 | Swan, III et al. | | 208/74 |
| 6,287,522 B1 | 9/2001 | Lomas | | 422/144 |
| 6,455,750 B1 | 9/2002 | Steffens et al. | | 585/648 |
| 6,538,169 B1 | 3/2003 | Pittman et al. | | 585/653 |
| 6,656,344 B1 | 12/2003 | Rao et al. | | 208/113 |
| 6,723,227 B1 | 4/2004 | Samson | | 208/113 |
| 6,791,002 B1 | 9/2004 | Abrevaya et al. | | 585/648 |
| 6,835,302 B2 | 12/2004 | Cammy et al. | | 208/113 |
| 6,866,771 B2 | 3/2005 | Lomas et al. | | 208/74 |
| 7,029,571 B1 | 4/2006 | Bhattacharyya et al. | | 208/76 |
| 7,033,546 B2 | 4/2006 | Lomas | | 422/145 |
| 7,041,259 B2 | 5/2006 | Cammy et al. | | 422/145 |
| 7,083,762 B2 | 8/2006 | Kuechler et al. | | 422/144 |
| 7,102,050 B1 | 9/2006 | Lattner et al. | | 585/640 |
| 7,112,307 B2 | 9/2006 | Abrevaya et al. | | 422/142 |
| 7,122,160 B2 | 10/2006 | Brookhart | | 422/145 |
| 7,169,293 B2 | 1/2007 | Lomas et al. | | 208/146 |
| 7,195,741 B2 | 3/2007 | Lattner et al. | | 422/141 |
| 7,261,807 B2 | 8/2007 | Henry et al. | | 208/113 |
| 7,312,370 B2 | 12/2007 | Pittman et al. | | 585/648 |
| 2002/0003103 A1 | 1/2002 | Henry et al. | | 208/106 |
| 2003/0116471 A1 | 6/2003 | Zhang et al. | | 208/113 |
| 2005/0074371 A1 | 4/2005 | Lomas et al. | | 422/144 |
| 2005/0118076 A1 | 6/2005 | Lomas | | 422/139 |
| 2006/0076269 A1 | 4/2006 | Lomas | | 208/113 |
| 2006/0113217 A1 | 6/2006 | Andreux | | 208/113 |
| 2006/0229483 A1 | 10/2006 | Kuechler et al. | | 585/639 |
| 2006/0283777 A1 | 12/2006 | Alvarenga Baptista | | 208/120.1 |
| 2007/0007176 A1 | 1/2007 | Pinho et al. | | 208/108 |
| 2007/0122316 A1 | 5/2007 | Lomas et al. | | 422/145 |

FOREIGN PATENT DOCUMENTS

| | | |
|---|---|---|
| EP | 305720 | 7/1988 |
| EP | 325437 | 7/1989 |
| EP | 168979 | 8/1989 |
| EP | 490435 | 4/1991 |
| EP | 814144 | 12/1997 |
| EP | 834540 | 4/1998 |
| EP | 867497 | 9/1998 |
| EP | 909582 | 4/1999 |
| EP | 968256 | 1/2000 |
| EP | 1146107 | 10/2001 |
| WO | 00/31215 | 6/2000 |
| WO | 03/054115 | 7/2003 |

* cited by examiner

METHOD AND APPARATUS FOR MAKING A MIDDLE DISTILLATE PRODUCT AND LOWER OLEFINS FROM A HYDROCARBON FEEDSTOCK

This application is a continuation-in-part of U.S. application Ser. No. 11/199,050, filed Aug. 8, 2005, now pending and which claims the benefit of U.S. Provisional Application Ser. No. 60/600,264, filed August 10, 2004.

The invention relates to method and apparatus for the manufacture of a middle distillate product and lower olefins from a hydrocarbon feedstock.

BACKGROUND OF THE INVENTION

The fluidized catalytic cracking (FCC) of heavy hydrocarbons to produce lower boiling hydrocarbon products such as gasoline is well known in the art. FCC processes have been around since the 1940's. Typically, an FCC unit or process includes a riser reactor, a catalyst separator and stripper, and a regenerator. A FCC feedstock is introduced into the riser reactor wherein it is contacted with hot FCC catalyst from the regenerator. The mixture of the feedstock and FCC catalyst passes through the riser reactor and into the catalyst separator wherein the cracked product is separated from the FCC catalyst. The separated cracked product passes from the catalyst separator to a downstream separation system and the separated catalyst passes to the regenerator where the coke deposited on the FCC catalyst during the cracking reaction is burned off the catalyst to provide a regenerated catalyst. The resulting regenerated catalyst is used as the aforementioned hot FCC catalyst and is mixed with the FCC feedstock that is introduced into the riser reactor.

U.S. Pat. No. 3,928,172 discloses an arrangement of reactors that provides for the gasoline product of gas oil cracking to be re-cracked in a dense fluid catalyst bed reaction zone with freshly regenerated catalyst. The used catalyst from the gasoline re-cracking reactor is used for the gas oil cracking in a riser cracking zone; however, there is no teaching that a portion of the freshly regenerated catalyst may bypass the gasoline re-cracking reactor to be used in combination with the used catalyst from gasoline re-cracking reactor in the riser cracking zone. This patent focuses on the production of gasoline that satisfies certain quality specifications, and, thus, it is not directed to a process for converting gas oil to preferentially yield middle distillate and lower olefin products. Therefore, the patent fails to recognize numerous various means by which higher lower olefin and middle distillate yields may be achieved in the above-described process arrangement involving the re-cracking of heavy gasoline in the boiling range of 260° F. to 380° F.

U.S. Pat. No. 5,372,704 discloses a process for the cracking and re-cracking of liquid hydrocarbons. Feed to the re-cracking reactor may be FCC heavy naphtha. The re-cracking reactor uses spent catalyst from the FCC reactor with up to 100% of the catalyst used in the re-cracker reactor being spent FCC catalyst. The re-cracking catalyst activity is controlled by mixing hot regenerated FCC catalyst with the spent FCC catalyst. The re-cracking catalyst mixture includes from 50 to 95 wt % spent FCC catalyst and from 5 to 50 wt % regenerated FCC catalyst. Spent re-cracking catalyst may be used in the FCC riser reactor along with hot regenerated FCC catalyst. This patent focuses on improving the quality of FCC gasoline and generating higher yields of gasoline from refinery streams, and it is not directed to a process for converting gas oil to preferentially yield middle distillate and lower olefin products. Therefore, the patent fails to recognize numerous various means by which higher lower olefin and middle distillate yields may be achieved in its process.

As noted above, many FCC processes and systems are designed so as to provide for a high conversion of the FCC feedstock to products having boiling temperatures in the gasoline boiling range. There are situations, however, when it is desirable to provide for the high conversion of the FCC feedstock to middle distillate boiling range products, as opposed to gasoline boiling range products, and to lower olefins. However, making lower olefins requires high severity and high reaction temperature reaction conditions. These conditions normally result in low middle distillate product yield and poor middle distillate product quality. It is therefore very difficult in the conventional cracking of hydrocarbons to provide simultaneously for both a high yield of lower olefins and a high yield of middle distillate products.

SUMMARY OF THE INVENTION

It is, thus, an object of the invention to provide a method or process that resolves some of the technical difficulties associated with the cracking of hydrocarbons to simultaneously maximize the yield of middle distillate and lower olefins.

It is also an object of this invention to provide method and apparatus for the preferential conversion of a hydrocarbon feedstock to a middle distillate product and lower olefins.

Accordingly, a process is provided for making middle distillate and lower olefins by catalytically cracking a gas oil feedstock within a riser reactor zone by contacting under suitable catalytic cracking conditions within the riser reactor zone the gas oil feedstock with a middle distillate selective cracking catalyst that comprises amorphous silica alumina and a zeolite to yield a cracked gas oil product and a spent cracking catalyst. The spent cracking catalyst is regenerated to yield a regenerated cracking catalyst. The gasoline feedstock is contacted within a dense bed reactor zone and under suitable high severity cracking conditions with the regenerated cracking catalyst to yield a cracked gasoline product and a used regenerated cracking catalyst. The used regenerated cracking catalyst is used as the middle distillate selective catalyst.

According to another embodiment of the invention, provided is a process for making middle distillate and lower olefins, said process comprises: catalytically cracking a gas oil feedstock within an FCC riser reactor zone by contacting under suitable catalytic cracking conditions within said FCC riser reactor zone said gas oil feedstock with a middle distillate selective cracking catalyst that comprises amorphous silica alumina and a zeolite to yield an FCC riser reactor product comprising a cracked gas oil product and a spent cracking catalyst; regenerating said spent cracking catalyst to yield a regenerated cracking catalyst; contacting a gasoline feedstock with said regenerated cracking catalyst within an intermediate cracking reactor operated under suitable high severity cracking conditions so as to yield a cracked gasoline product, comprising at least one lower olefin compound, and a used regenerated cracking catalyst; separating said cracked gasoline product into a lower olefin product, comprising said at least one lower olefin compound; and using said used regenerated cracking catalyst as said middle distillate selective catalyst.

According to another invention, provided is an apparatus that comprises riser reactor means for contacting a gas oil feedstock with a catalytic cracking catalyst under catalytic cracking conditions to yield a riser reactor product comprising a cracked gas oil product and a spent cracking catalyst; separator means for separating the riser reactor product into the cracked gas oil product and the spent cracking catalyst; regenerator means for regenerating the spent cracking catalyst to yield a regenerated catalyst; dense bed reactor means for contacting a gasoline feedstock with the regenerated catalyst under high severity conditions to yield a cracked gasoline product and a used regenerated catalyst; and means for providing for the use of the used regenerated catalyst as the catalytic cracking catalyst.

DETAILED DESCRIPTION OF THE INVENTION

The invention is a process and apparatus that provides for the processing of a heavy hydrocarbon feedstock to selectively produce middle distillate boiling range products and lower olefins. It has been discovered that the use of an intermediate cracking reactor, which can include reactors of the type such as a dense phase reactor, or fixed fluidized bed reactor, or a riser reactor, between the catalyst regenerator and an FCC riser reactor of a conventional FCC process or unit can provide for an improved middle distillate yield and for enhanced selectivity toward the production of lower olefins.

The inventive process utilizes the intermediate cracking reactor to provide for the cracking of a gasoline feedstock that preferably boils in the gasoline temperature range to yield lower olefins and for the conditioning of the catalyst so that when it is used in the cracking of the FCC feedstock in the FCC riser reactor the reactor conditions are more suitable for the production of a middle distillate product.

An additional feature of the inventive process is that it can further include a system integrated into the process to provide for the processing of the lower olefins yielded from the intermediate cracking reactor. This olefin processing system can perform such functions as the separation of the lower olefins into specific olefin product streams, such as an ethylene product stream, a propylene product stream or a butylenes product stream or any combination thereof, and the use of the lower olefins as a polymerization feed in the manufacture of polyolefins.

In the inventive process, a gas oil feedstock is introduced into the bottom of an FCC riser reactor where it is mixed with hot cracking catalyst such as a regenerated cracking catalyst or a used regenerated cracking catalyst or a combination of both catalysts. The starting catalytic cracking catalyst used in the inventive process and regenerated to ultimately become the regenerated cracking catalyst can be any suitable cracking catalyst known in the art to have cracking activity at the elevated temperatures contemplated by the invention.

Preferred catalytic cracking catalysts for use in the inventive process include fluidizable cracking catalysts comprised of a molecular sieve having cracking activity dispersed in a porous, inorganic refractory oxide matrix or binder. The term "molecular sieve" as used herein refers to any material capable of separating atoms or molecules based on their respective dimensions. Molecular sieves suitable for use as a component of the cracking catalyst include pillared clays, delaminated clays, and crystalline aluminosilicates. Normally, it is preferred to use a cracking catalyst that contains a crystalline aluminosilicate. Examples of such aluminosilicates include Y zeolites, ultrastable Y zeolites, X zeolites, zeolite beta, zeolite L, offretite, mordenite, faujasite, and zeolite omega. The preferred crystalline aluminosilicates for use in the cracking catalyst are X and Y zeolites with Y zeolites being the most preferred.

U.S. Pat. No. 3,130,007, the disclosure of which is hereby incorporated by reference in its entirety, describes Y-type zeolites having an overall silica-to-alumina mole ratio between about 3.0 and about 6.0, with a typical Y zeolite having an overall silica-to-alumina mole ratio of about 5.0. It is also known that Y-type zeolites can be produced, normally by dealumination, having an overall silica-to-alumina mole ratio above about 6.0. Thus, for purposes of this invention, a Y zeolite is one having the characteristic crystal structure of a Y zeolite, as indicated by the essential X-ray powder diffraction pattern of Y zeolite, and an overall silica-to-alumina mole ratio above 3.0, and includes Y-type zeolites having an overall silica-to-alumina mole ratio above about 6.0.

The stability and/or acidity of a zeolite used as a component of the cracking catalyst may be increased by exchanging the zeolite with hydrogen ions, ammonium ions, polyvalent metal cations, such as rare earth-containing cations, magnesium cations or calcium cations, or a combination of hydrogen ions, ammonium ions and polyvalent metal cations, thereby lowering the sodium content until it is less than about 0.8 weight percent, preferably less than about 0.5 weight percent and most preferably less than about 0.3 weight percent, calculated as $Na_2O$. Methods of carrying out the ion exchange are well known in the art.

The zeolite or other molecular sieve component of the cracking catalyst is combined with a porous, inorganic refractory oxide matrix or binder to form a finished catalyst prior to use. The refractory oxide component in the finished catalyst may be silica-alumina, silica, alumina, natural or synthetic clays, pillared or delaminated clays, mixtures of one or more of these components and the like. Preferably, the inorganic refractory oxide matrix will comprise a mixture of silica-alumina and a clay such as kaolin, hectorite, sepiolite and attapulgite. A preferred finished catalyst will typically contain between about 5 weight percent to about 40 weight percent zeolite or other molecular sieve and greater than about 20 weight percent inorganic, refractory oxide. In general, the finished catalyst may contain between about 10 to about 35 weight percent zeolite or other molecular sieve, between about 10 to about 30 weight percent inorganic, refractory oxide, and between about 30 to about 70 weight percent clay.

The crystalline aluminosilicate or other molecular sieve component of the cracking catalyst may be combined with the porous, inorganic refractory oxide component or a precursor thereof by any suitable technique known in the art including mixing, mulling, blending or homogenization. Examples of precursors that may be used include alumina, alumina sols, silica sols, zirconia, alumina hydrogels, polyoxycations of aluminum and zirconium, and peptized alumina. In a preferred method of preparing the cracking catalyst, the zeolite is combined with an alumino-silicate gel or sol or other inorganic, refractory oxide component, and the resultant mixture is spray dried to produce finished catalyst particles normally ranging in diameter between about 40 and about 80 microns. If desired, however, the zeolite or other molecular sieve may be mulled or otherwise mixed with the refractory oxide component or precursor thereof, extruded and then ground into the desired particle size range. Normally, the finished catalyst will have an average bulk density between about 0.30 and about 0.90 gram per cubic centimeter and a pore volume between about 0.10 and about 0.90 cubic centimeter per gram.

When the inventive process is operated in the middle distillate selective mode (or diesel mode) of operation, it is most preferred to use as the catalytic cracking catalyst a middle distillate selective cracking catalyst. A middle distillate selective cracking catalyst is similar to the above-described preferred cracking catalyst in that it comprises a molecular sieve dispersed in a porous, inorganic refractory oxide binder, but it has some significant differences over the typical cracking catalyst, which such differences are hereafter described in more detail. The middle distillate cracking catalyst exhibits catalytic properties that when used in combination with various features of the inventive process provide for the selective cracking of a gas oil feedstock to yield a cracked gas oil product that preferentially includes middle distillate boiling range products such as those in the diesel boiling range, such as from 230° C. (446° F.) to 350° C. (662° F.).

The middle distillate selective cracking catalyst comprises zeolite or other molecular sieve component, an alumina component and an additional porous, inorganic refractory matrix or binder component. The middle distillate selective cracking catalyst can be prepared by any method known to those skilled in the art that provide for a catalytic cracking catalyst having the desired composition. More specifically, the middle distillate selective cracking catalyst can comprise alumina in the amount in the range of from 40 wt. % to 65 wt. %, preferably from 45 wt. % to 62 wt. %, and most preferably, from 50 wt. % to 58 wt. %, with the weight percent being based on the total weight of the middle distillate selective cracking catalyst, a porous inorganic refractory oxide matrix component providing a matrix surface area, and a zeolite or other molecular sieve component providing a zeolitic surface area. The alumina component of the middle distillate selective cracking catalyst can be any suitable type of alumina and from any suitable source. Examples of suitable types of aluminas are those as disclosed in U.S. Pat. Nos. 5,547,564 and 5,168,086, which are incorporated herein by reference, and include, for example, alpha alumina, gamma alumina, theta alumina, eta alumina, bayerite, pseudoboehmite and gibbsite.

The matrix surface area within the middle distillate selective cracking catalyst that is provided by the porous inorganic refractory oxide matrix component may be in the range of from 20 square meters per gram of middle distillate selective cracking catalyst (20 $m^2/g$) to 90 $m^2/g$. The zeolitic surface area within the middle distillate selective cracking catalyst that is provided by the zeolite or other molecular sieve component should be less than 140 $m^2/g$.

In order for the middle distillate selective cracking catalyst to have the desired catalytic property of preferentially providing for the yield of middle distillate such as diesel, it is particularly important for the portion of the surface area of the middle distillate selective cracking catalyst that is contributed by the zeolite or other molecular sieve component, i.e. the zeolitic surface area, to be less than 130 $m^2/g$, preferably, less than 110 $m^2/g$, and, most preferably, less than 100 $m^2/g$. The preferred zeolite or other molecular sieve component of the middle distillate selective cracking catalyst are those aluminosilicates selected from the group consisting of Y zeolites, ultrastable Y zeolites, X zeolites, zeolite beta, zeolite L, offretite, mordenite, faujasite, and zeolite omega.

The zeolitic surface area within the middle distillate selective cracking catalyst can be as low as 20 $m^2/g$, but, generally, the lower limit is greater than 40 $m^2/g$. Preferably, the lower limit for the zeolitic surface area within the middle distillate selective cracking catalyst exceeds 60 $m^2/g$, and, most preferably, the zeolitic surface area exceeds 80 $m^2/gm$. Thus, for example, the portion of the surface area of the middle distillate selective cracking catalyst contributed by the zeolite or other molecular sieve component, i.e. the zeolitic surface area, can be in the range of from 20 $m^2/g$ to 140 $m^2/g$, or in the range of from 40 $m^2/g$ to 130 $m^2/g$. A preferred range for the zeolitic surface area is from 60 $m^2/g$ to 110 $m^2/g$, and, most preferred, from 80 $m^2/g$ to 100 $m^2/g$.

The ratio of the zeolitic surface area to the matrix surface area within the middle distillate cracking catalyst is a property thereof which is important in providing for a catalyst having the desired cracking properties. The ratio of zeolitic surface area to matrix surface area, thus, should be in the range of from 1:1 to 2:1, preferably, from 1.1:1 to 1.9:1, and most preferably, from 1.2:1 to 1.7:1. Considering these ratios, the portion of the surface area of the middle distillate selective cracking catalyst contributed by the porous inorganic refractory oxide matrix component, i.e., the matrix surface area, is generally in the range of from 20 $m^2/g$ to 80 $m^2/g$. A preferred range for the matrix surface area is from 40 $m^2/g$ to 75 $m^2/g$, and, most preferred, the range is from 60 $m^2/g$ to 70 $m^2/g$.

In the case of the use in the inventive process of an FCC riser reactor that is vertically arranged, lift gas or lift steam may also be introduced into the bottom of the FCC riser reactor along with the gas oil feedstock and the hot cracking catalyst. The regenerated cracking catalyst that is yielded from the catalyst regenerator has a higher temperature than the used regenerated cracking catalyst that is yielded from the intermediate cracking reactor. Also, the used regenerated cracking catalyst has deposited thereon as a result of its use in the intermediate cracking reactor a certain amount of coke. As will be discussed more fully elsewhere herein, a particular catalyst or combination of catalysts may be used to help control the conditions within the FCC riser reactor to provide for certain desired cracking conditions required to provide a desired product or mix of products.

The mixture of gas oil feedstock and hot cracking catalyst, and, optionally, lift gas or steam, passes through the FCC riser reactor wherein cracking takes place. The FCC riser reactor defines a catalytic cracking zone and provides means for providing a contacting time to allow the cracking reactions to occur. The average residence time of the hydrocarbons in the FCC riser reactor generally can be in the range of upwardly to about 5 to 10 seconds, but usually is in the range of from 0.1 to 5 seconds. The weight ratio of catalyst to hydrocarbon feed (catalyst/oil ratio) generally can be in the range of from about 2 to about 100 and even as high as 150. More typically, the catalyst-to-oil ratio can be in the range of from 5 to 100. When steam is introduced into the FCC riser reactor with the gas oil feedstock, the steam-to-oil weight ratio can be in the range of from 0.01 to 5, and, more, typically, it is in the range of from 0.05 to 1.5.

The temperature in the FCC riser reactor generally can be in the range of from about 400° C. (752° F.) to about 600° C. (1112° F.). More typically, the FCC riser reactor temperature can be in the range of from 450° C. (842° F.) to 550° C. (1022° F.). The FCC riser reactor temperatures of the inventive process will tend to be lower than those of typical conventional fluidized catalytic cracking processes; because, the inventive process is to provide for a high yield of middle distillates as opposed to the production of gasoline as is often sought with conventional fluidized catalytic cracking processes. Indeed, as more fully described elsewhere herein, one of the embodiments of the inventive process provides for the control of certain of the process conditions within the FCC riser reactor by adjusting the ratio of regenerated cracking catalyst from the catalyst regenerator to used regenerated cracking catalyst from the intermediate cracking reactor that is introduced into the bottom of the FCC riser reactor.

The mixture of hydrocarbons and catalyst from the FCC riser reactor pass as an FCC riser reactor product comprising cracked gas oil product and spent cracking catalyst to a stripper system that provides means for separating hydrocarbons from catalyst and defines a stripper separation zone wherein the cracked gas oil product is separated from the spent cracking catalyst. The stripper system can be any system or means known to those skilled in the art for separating FCC catalyst from a hydrocarbon product. In a typical stripper operation, the FCC riser reactor product, which is a mixture of cracked gas oil product and spent cracking catalyst passes to the stripper system that includes cyclones for separating the spent cracking catalyst from the vaporous cracked gas oil product. The separated spent cracking catalyst enters the stripper vessel from the cyclones where it is contacted with steam to further remove cracked gas oil product from the spent cracking catalyst. The coke content on the separated spent cracking catalyst is, generally, in the range of from about 0.5 to about 5 weight percent (wt. %), based on the total weight of the catalyst and the carbon. Typically, the coke content on the separated spent cracking catalyst is in the range of from or about 0.5 wt. % to or about 1.5 wt. %.

The separated spent cracking catalyst is then passed to a catalyst regenerator that provides means for regenerating the separated spent cracking catalyst and defines a regeneration zone into which the separated spent cracking catalyst is introduced and wherein carbon that is deposited on the separated spent cracking catalyst is burned in order to remove the carbon to provide a regenerated cracking catalyst having a reduced carbon content. The catalyst regenerator typically is a vertical cylindrical vessel that defines the regeneration zone and wherein the spent cracking catalyst is maintained as a fluidized bed by the upward passage of an oxygen-containing regeneration gas, such as air.

The temperature within the regeneration zone is, in general, maintained in the range of from about 621° C. (1150° F.) to 760° C. (1400° F.), and more, typically, in the range of from 677° C. (1250° F.) to 715° C. (1320° F.). The pressure within the regeneration zone typically is in the range of from about atmospheric to about 345 kPa (50 psig), and, preferably, from about 34 to 345 kPa (5 to 50 psig). The residence time of the separated spent cracking catalyst within the regeneration zone is in the range of from about 1 to about 6 minutes, and, typically, from or about 2 to or about 4 minutes. The coke content on the regenerated cracking catalyst is less than the coke content on the separated spent cracking catalyst and, generally, is less than 0.5 wt. %, with the weight percent being based on the the weight of the regenerated cracking catalyst excluding the weight of the coke content. The coke content of the regenerated cracking catalyst will, thus, generally, be in the range of from or about 0.01 wt. % to or about 0.5 wt. %. It is preferred for the coke concentration on the regenerated cracking catalyst to be less than 0.3 wt. % and, it will thus preferably be in the range of from 0.01 wt. % to 0.3 wt. %. Most preferably, the coke concentration on the regenerated cracking catalyst is less than 0.1 wt. % and, thus, in the range of from 0.01 wt. % to 0.1 wt. %.

The regenerated cracking catalyst from the catalyst regenerator is passed to the intermediate cracking reactor, which can be as noted above a dense phase reactor, or a fixed fluidized bed reactor, or a riser reactor, that provides means for contacting a gasoline feedstock with the regenerated cracking catalyst and which defines a reaction or cracking zone wherein the gasoline feedstock is contacted with the regenerated cracking catalyst under suitable high severity cracking conditions, either with or without the presence of steam.

The preferred type of intermediate cracking reactor for use in the inventive process is a dense phase reactor. The dense phase reactor can be a vessel that defines two zones, including an intermediate reaction or cracking or dense phase reaction zone, and a stripping zone. Contained within the intermediate reaction zone of the vessel is regenerated cracking catalyst that is fluidized by the introduction of the gasoline feedstock and, optionally, steam, which is introduced into the stripping zone.

A particularly beneficial dense phase reactor design includes a dense phase reactor vessel that defines the intermediate reaction zone and the stripping zone that are in fluid communication with each other with the stripping zone located below the intermediate reaction zone. To provide for a high steam velocity within the stripping zone, as compared to its velocity within the intermediate reaction zone, the cross sectional area of the stripping zone is less than the cross sectional area of the intermediate reaction zone. The ratio of the stripping zone cross sectional area to the intermediate reaction zone cross sectional area can be in the range of from 0.1:1 to 0.9:1, preferably, from 0.2:1 to 0.8:1, and, most preferably, from 0.3:1 to 0.7:1.

In an embodiment in which the geometry of the dense phase reactor vessel is such that it is generally cylindrical in shape, the length-to-diameter ratio of the stripping zone is such as to provide for the desired high steam velocity within the stripping zone and to provide enough contact time within the stripping zone for the desired stripping of the used regenerated catalyst that is to be removed from the dense phase reactor vessel. Thus, the length-to-diameter dimension of the stripping zone can be in the range of from 1:1 to 25:1, preferably, from 2:1 to 15:1, and, most preferably, from 3:1 to 10:1.

The dense phase reactor vessel is equipped with a catalyst introduction conduit that provides regenerated catalyst introduction means for introducing the regenerated cracking catalyst from the catalyst regenerator into the intermediate reaction zone of the dense phase reactor vessel. The dense phase reactor vessel is further equipped with a used regenerated catalyst withdrawal conduit that provides used regenerated catalyst withdrawal means for withdrawing used regenerated catalyst from the stripping zone of the dense phase reactor vessel. The gasoline feedstock is introduced into the intermediate reaction zone by way of a feed introduction conduit providing means for introducing a gasoline feedstock into the intermediate zone of the dense phase reactor, and the steam is introduced into the stripping zone by way of a steam introduction conduit providing means for introducing steam into the stripping zone of the dense phase reactor. The cracked gasoline product is withdrawn from the intermediate reaction zone by way of a product withdrawal conduit providing means for withdrawing a cracked gasoline product from the intermediate zone of the dense phase reactor.

One of the special features of the inventive process is that the intermediate cracking reactor can be operated or controlled independently from the operation or control of the FCC riser reactor. This independent operation or control of the intermediate cracking reactor provides the benefit of an improved overall, i.e., across the entire process system including the FCC riser reactor as well as the intermediate cracking reactor, conversion of the gas oil feedstock into the desired end-products of middle distillate and the lower olefins of ethylene, propylene and butylenes. With the independent operation of the intermediate cracking reactor, the severity of the FCC riser reactor cracking conditions can be reduced to thereby provide for a higher yield of middle distillate product in the gas oil reactor product, and the severity of the intermediate cracking reactor can be controlled to optimize the yield of lower olefins.

One way of controlling the operation of the intermediate cracking reactor is by the introduction of steam along with the gasoline feedstock into the intermediate cracking reactor. Thus, the dense phase reaction zone is operated under such reaction conditions as to provide for a cracked gasoline product and, preferably, to provide for a high cracking yield of lower olefins. The high severity cracking conditions can include a temperature within the dense phase or intermediate reaction zone that is in the range from about 482° C. (900° F.) to about 871° C. (1600° F.), but, preferably, the temperature is in the range of from 510° C. (950° F.) to 871° C. (1600° F.), and, most preferably, from 538° C. (1000° F.) to 732° C. (1350° F.). The pressure within the intermediate reaction zone can be in the range of from about atmospheric to about 345 kPa (50 psig), and, preferably, from about 34 to 345 kPa (5 to 50 psig).

While the introduction of steam along with the gasoline feedstock into the stripping zone has previously been indicated as being optional, a preferred aspect of the invention, however, is for steam to be introduced into the stripping zone of the intermediate cracking reactor and to be contacted with the regenerated cracking catalyst contained therein and in the intermediate reaction zone. It has been demonstrated that the use of steam in this manner provides, for a given gas oil conversion across the inventive process system, an increase in the propylene yield and butylene yield. It is a particularly unique feature of the inventive process, which uses a middle distillate selective cracking catalyst in combination with steam addition to the intermediate cracking reactor, that it provides for the greatly improved yields across the process system of middle distillate and lower olefins. It has generally been understood by those skilled in the art that in conventional gas oil reactor cracking processes low severity gas oil reactor cracking conditions result in less lower olefins yield relative to high severity gas oil reactor cracking conditions. The inventive process as hereindescribed, however, allows for the reduction in FCC riser reactor cracking severity in order to enhance the yield of middle distillate product while still providing for an increased yield in lower olefins via the use of the intermediate cracking reactor. The use of steam in the intermediate cracking reactor provides further enhancements in the yield of lower olefins therefrom.

The use of the steam is particularly desirable; because, for a given gas oil conversion across the process system, and in the cracking of the gasoline feedstock in the intermediate cracking reactor, it can provide for an improved selectivity toward lower olefin yield with an increase in propylene and butylenes yield. Thus, when steam is used, the weight ratio of steam to gasoline feedstock introduced into the intermediate cracking reactor, with gasoline being introduced into the reaction zone and steam being introduced into the stripping zone, can be in the range of upwardly to or about 15:1, but, preferably, the range is from 0.1:1 to 10:1. More preferably, the weight ratio of steam to gasoline feedstock is in the range of from 0.2:1 to 9:1, and, most preferably, from 0.5:1 to 8:1.

Used regenerated cracking catalyst is removed from the intermediate cracking reactor and utilized as hot cracking catalyst mixed with the gas oil feedstock that is introduced into the FCC riser reactor. One beneficial aspect of the inventive process, in addition to its high yield of lower olefins, is that it provides for the partial deactivation of the regenerated catalyst prior to its use as hot cracking catalyst in the FCC riser reactor. What is meant by partial deactivation is that the used regenerated cracking catalyst will contain a slightly higher concentration of carbon than the concentration of carbon that is on the regenerated cracking catalyst. This partial deactivation of the regenerated cracking catalyst helps provide for a preferred product yield when the gas oil feedstock is cracked within the riser reactor zone. The coke concentration on the used regenerated cracking catalyst is greater than the coke concentration on the regenerated cracking catalyst, but it is less than that of the separated spent cracking catalyst. Thus, the coke content of the used regenerated catalyst can be greater than 0.1 wt. % and even greater than 0.5 wt. %. Preferably, the coke content of the used regenerated catalyst is in the range of from about 0.1 wt. % to about 1 wt. %, and, most preferably, from 0.1 wt. % to 0.6 wt. %.

Another benefit provided by the use of the intermediate cracking reactor is associated with the used regenerated cracking catalyst having a temperature that is lower than the temperature of the regenerated cracking catalyst. This lower temperature of the used regenerated cracking catalyst in combination with the partial deactivation, as discussed above, provides further benefits in a preferential product yield from the cracking of the gas oil feedstock.

To assist in providing for the control of the process conditions within the FCC riser reactor of the inventive process and to provide for a desired product mix, the regenerated cracking catalyst can be divided into at least a portion that is passed to the intermediate cracking reactor and a remaining portion of the regenerated cracking catalyst that is mixed with the gas oil feedstock to be introduced into the FCC riser reactor. The at least a portion of the regenerated cracking catalyst introduced into the intermediate cracking reactor can be in the range of upwardly to 100 percent (%) of the regenerated cracking catalyst yielded from the catalyst regenerator depending upon the requirements of the process and the desired product yields. Specifically, however, the at least a portion of regenerated cracking catalyst will represent from about 10% to 100% of the separated regenerated catalyst withdrawn from the catalyst regenerator. Also, the at least a portion of regenerated cracking catalyst can be from about 30% to about 90%, and, more particularly, from 50% to 95% of the separated regenerated catalyst that is withdrawn from the catalyst regenerator.

In controlling the reaction conditions within the FCC riser reactor, as already noted, a combination or mixture of used regenerated cracking catalyst from the intermediate cracking reactor and the regenerated cracking catalyst from the catalyst regenerator is introduced into the FCC riser reactor with the gas oil feedstock. The relative amount of the used regenerated cracking catalyst to the regenerated cracking catalyst is adjusted so as to provide for the desired gas oil cracking conditions within the FCC riser reactor zone; but, generally, the weight ratio of the used regenerated cracking catalyst to the regenerated cracking catalyst is in the range of from 0.1:1 to 100:1, preferably, from 0.5:1 to 20:1, and, most preferably, from 1:1 to 10:1. For a system operated at steady state, the weight ratio of used regenerated cracking catalyst-to-regenerated cracking catalyst approximates the weight ratio of the at least a portion of regenerated cracking catalyst passing to the intermediate cracking reactor to the remaining portion of regenerated cracking catalyst that is mixed with the gas oil feedstock introduced into the FCC riser reactor, and, thus, the aforementioned ranges are also applicable to such weight ratio.

It is notable that it is not a desired aspect of the inventive process to introduce spent cracking catalyst into the intermediate cracking reactor for a variety of reasons. For instance, the spent cracking catalyst has much higher carbon content than the regenerated cracking catalyst and, thus, its activity does not favor the yielding of the more desirable lower olefins. Therefore, it is an important aspect of the invention for the regenerated cracking catalyst introduced into the intermediate cracking reactor to be more than 50 weight percent of the sum weight of the regenerated cracking catalyst and spent cracking catalyst that is introduced into the intermediated cracking reactor. But, for the best results, the amount of spent cracking catalyst introduced into the intermediate cracking reactor should be minimized and be less than 20 weight percent of the sum weight of the regenerated cracking catalyst and spent cracking catalyst that is introduced into the intermediate cracking reactor, preferably, less than 10 weight percent, and most preferably, less than 5 weight percent. It is an especially preferred feature of the invention that substantially no spent cracking catalyst is used or introduced into the intermediate cracking reactor of the inventive process.

Another method by which the process conditions within the FCC riser reactor are controlled and a desired product mix is provided is through the addition of a ZSM-5 additive into the intermediate cracking reactor, as opposed to its addition into the FCC riser reactor. Indeed, it is a particularly beneficial aspect of one embodiment of the inventive process for the ZSM-5 additive to be introduced into the intermediate cracking reactor, in particular, when a dense phase reactor is used, into the dense phase reaction zone thereof, along or concurrently with the regenerated catalyst that is a middle distillate selective cracking catalyst. When a ZSM-5 additive is used along with the middle distillate selective cracking catalyst in the intermediate cracking reactor, a huge improvement in the yield of the lower olefins such as propylene and butylenes can be achieved. Thus, it is desirable to introduce into the intermediate cracking reactor, particularly when the regenerated catalyst that is being introduced therein is a middle distillate selective cracking catalyst, ZSM-5 additive in an amount upwardly to 30 weight percent, preferably upwardly to 20 weight percent, and, most preferably, upwardly to 18 weight percent, of the regenerated catalyst being introduced into the intermediate cracking reactor. Thus, when ZSM-5 additive is introduced into the intermediate cracking reactor, the amount will be in the range of from 1 to 30 weight percent of the regenerated cracking catalyst being introduced into the intermediate cracking reactor, preferably from 3 to 20 weight percent, and, most preferably, from 5 to 18 weight percent.

The ZSM-5 additive is a molecular sieve additive selected from the family of medium pore size crystalline aluminosilicates or zeolites. Molecular sieves that can be used as the ZSM-5 additive of the present invention include medium pore zeolites as described in "Atlas of Zeolite Structure Types," Eds. W. H. Meier and D. H. Olson, Butterworth-Heineman, Third Edition, 1992, which is hereby incorporated by reference. The medium pore size zeolites generally have a pore size from about 0.5 nm, to about 0.7 nm and include, for example, MFI, MFS, MEL, MTW, EUO, MTT, HEU, FER, and TON structure type zeolites (IUPAC Commission of Zeolite Nomenclature). Non-limiting examples of such medium pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred is ZSM-5, which is described in U.S. Pat. Nos. 3,702,886 and 3,770,614.

ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. All of the above patents are incorporated herein by reference. Other suitable molecular sieves include the silicoaluminophosphates (SAPO), such as SAPO-4 and SAPO-11 which is described in U.S. Pat. No. 4,440,871; chromosilicates; gallium silicates, iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates.

The ZSM-5 additive may be held together with a catalytically inactive inorganic oxide matrix component, in accordance with conventional methods.

U.S. Pat. No. 4,368,114 describes in detail the class of zeolites that can be suitable ZSM-5 additives in the inventive process, and such patent is incorporated herein by reference.

The combination of one or more of the above described process variables and operating conditions allows for the control of the conversion of the gas oil feedstock. Generally, it is desired for the gas oil feedstock conversion to be in the range of from 30 to 90 weight percent, and, preferably, from 40 to 85 weight percent. What is meant by gas oil feedstock conversion is the weight amount of hydrocarbons contained in the gas oil feedstock that has a boiling temperature greater than 221° C. (430° F.) that is converted in the FCC riser reactor to hydrocarbons having a boiling temperature less than 221° C. (430° F.) divided by the weight amount of hydrocarbons contained in the gas oil feedstock having a boiling temperature greater than 221° C. (430° F.). As earlier noted, the inventive process may be operated so as to provide for the preferential or selective yielding of middle distillate boiling range products and lower olefins.

The feedstock charged to the process of the invention may be any heavy hydrocarbon feedstock that may be or is typically charged to a fluidized catalytic cracking unit that boil in the boiling range of from 200° C. (392° F.) to 800° C. (1472° F.), including, for example, gas oils, resid, or other hydrocarbons. In general terms, hydrocarbon mixtures boiling in the range of from 345° C. (650° F.) to 760° C. (1400° F.) can make particularly suitable feedstocks for the inventive process. Examples of the types of refinery feed streams that can make suitable gas oil feedstocks include vacuum gas oils, coker gas oil, straight-run residues, thermally cracked oils and other hydrocarbon streams.

The gasoline feedstock charged to the dense phase reaction zone may be any suitable hydrocarbon feedstock having a boiling temperature that is in the gasoline boiling temperature range. Generally, the gasoline feedstock comprises hydrocarbons boiling in the temperature range of from about 32° C. (90° F.) to about 204° C. (400° F.). Examples of refinery streams that may be used as the gasoline feedstock of the inventive process include straight run gasoline, naphtha, catalytically cracked gasoline, and coker naphtha.

Another embodiment of the invention may include the integration of the intermediate cracking reactor with a system for separating the cracked gasoline product into at least one lower olefin product, or a system for manufacturing a polyolefin, or a combination of both such systems. It is the enhanced production of lower olefins provided by the inventive process that makes it beneficial to integrate the FCC riser reactor and intermediate cracking reactor of the inventive process system with the further processing of the cracked gasoline product. Specifically, the increased yield of lower olefins through the use of steam or ZSM-5 additive, or both, in the intermediate cracking reactor provides the incentive to integrate the aforementioned process steps. Thus, the cracked gasoline product, comprising at least one lower olefin compound, such as, ethylene, propylene, or butylene, may further be passed to a separation system for separating the cracked gasoline product into a lower olefin product comprising at least one lower olefin compound. The lower olefin product may further be used as a feedstock to a polyolefin manufacturing system whereby the lower olefin is polymerized under suitable polymerization conditions preferably in the presence of any suitable polymerization catalyst known to those skilled in the art.

Figure 1:
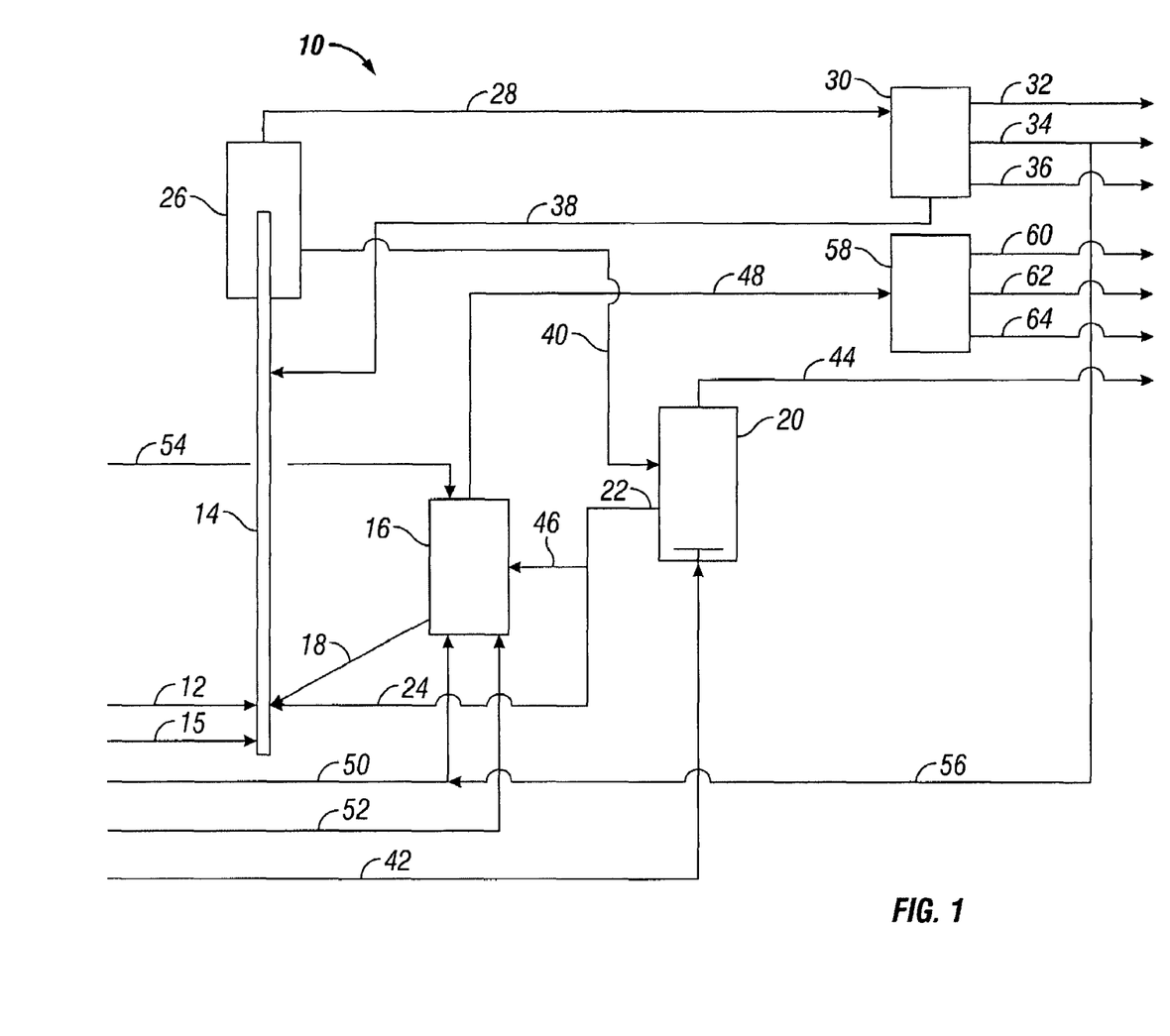
FIG. 1 is a process flow schematic representing certain aspects of the inventive process.

Now referring to FIG. 1 that presents a process flow schematic representative of one aspect of the inventive process 10. In the inventive process 10, a gas oil feedstock passes through conduit 12 and is introduced into the bottom of FCC riser reactor 14. FCC riser reactor 14 defines an FCC riser reactor zone, or cracking reaction zone, wherein the gas oil feedstock is mixed with a catalytic cracking catalyst. Steam may also be introduced into the bottom of FCC riser reactor 14 by way of conduit 15. This steam can serve to atomize the gas oil feedstock or as a lifting fluid. Typically, when steam is used to atomize the gas oil feedstock, the amount of steam used can be in the range of from 1 to 5 or 10 weight percent of the gas oil feedstock. The catalytic cracking catalyst can be a used regenerated cracking catalyst or a regenerated cracking catalyst, or a combination of both catalysts.

The used regenerated cracking catalyst is a regenerated cracking catalyst that has been used in dense bed reactor 16 in the high severity cracking of a gasoline feedstock. The used regenerated cracking catalyst passes from dense bed reactor 16 and is introduced into FCC riser reactor 14 by way of conduit 18. Regenerated cracking catalyst may also be mixed with the gas oil feedstock. The regenerated cracking catalyst passes from regenerator 20 through conduit 22 and is introduced by way of conduit 24 into FCC riser reactor 14 wherein it is mixed with the gas oil feedstock.

Passing through FCC riser reactor 14 that is operated under catalytic cracking conditions is a mixture of gas oil feedstock and hot catalytic cracking catalyst that forms an FCC riser reactor product comprising a mixture of a cracked gas oil product and a spent cracking catalyst. The FCC riser reactor product passes from FCC riser reactor 14 and is introduced into stripper system or separator/stripper 26.

The separator/stripper 26 can be any conventional system that defines a separation zone or stripping zone, or both, and provides means for separating the cracked gas oil product and spent cracking catalyst. The separated cracked gas oil product passes from separator/stripper 26 by way of conduit 28 to separation system 30. The separation system 30 can be any system known to those skilled in the art for recovering and separating the cracked gas oil product into the various FCC products, such as, for example, cracked gas, cracked gasoline, cracked gas oils and cycle oil. The separation system 30 may include such systems as absorbers and strippers, fractionators, compressors and separators or any combination of known systems for providing recovery and separation of the products that make up the cracked gas oil product.

The separation system 30, thus, defines a separation zone and provides means for separating the cracked gas oil product into cracked products. The cracked gas, cracked gasoline and cracked gas oils respectively pass from separation system 30 through conduits 32, 34, and 36. The cycle oil passes from separation system 30 through conduit 38 and is introduced into FCC riser reactor 14. The separated spent cracking catalyst passes from separator/stripper 26 through conduit 40 and is introduced into regenerator 20. Regenerator 20 defines a regeneration zone and provides means for contacting the spent cracking catalyst with an oxygen-containing gas, such as air, under carbon burning conditions to remove carbon from the spent cracking catalyst. The oxygen-containing gas is introduced into regenerator 20 through conduit 42 and the combustion gases pass from regenerator 20 by way of conduit 44.

The regenerated cracking catalyst passes from regenerator 20 through conduit 22. As an optional feature of the inventive process, the stream of regenerated cracking catalyst passing through conduit 22 may be divided into two streams with at least a portion of the regenerated catalyst passing from regenerator 20 through conduit 22 passing through conduit 46 to the dense bed reactor 16 and with the remaining portion of the regenerated catalyst passing from regenerator 20 passing through conduit 24 to FCC riser reactor 14. To assist in the control of the cracking conditions in the FCC riser reactor 14, the split between the at least a portion of regenerated cracking catalyst passing through conduit 46 and the remaining portion of regenerated cracking catalyst passing through conduit 24 can be adjusted as required.

The dense bed reactor 16 defines a dense bed fluidization zone and provides means for contacting a gasoline feedstock with the regenerated cracking catalyst contained within the dense bed reactor 16. The dense bed fluidization zone is operated under high severity cracking conditions so as to preferentially crack the gasoline feedstock to lower olefin compounds, such as ethylene, propylene, and butylenes, and to yield a cracked gasoline product. The cracked gasoline product passes from dense bed reactor 16 through conduit 48.

The used regenerated cracking catalyst passes from dense bed reactor 16 through conduit 18 and is introduced into FCC riser reactor 14. The gasoline feedstock is introduced into the dense bed reactor 16 through conduit 50 and steam is introduced into the dense bed reactor 16 by way of conduit 52. The gasoline feedstock and steam are introduced into the dense bed reactor 16 so as to provide for a fluidized bed of the regenerated catalyst. A ZSM-5 additive may be added to the regenerated catalyst of the dense phase reactor 16 or introduced into the dense bed reactor 16 through conduit 54. In one embodiment of the inventive process, a portion, or the entire amount, of the cracked gasoline passing from separation system 30 through conduit 34 may be recycled and introduced into the dense bed reactor 16 by way of conduits 56 and 50. This recycling of the cracked gasoline product can provide for an additional conversion across the overall process system of the gas oil feedstock to desirable lower olefins. The cracked gasoline product of conduit 48 passes to olefin separation system 58. The olefin separation system 58 can be any system known to those skilled in the art for recovering and separating the cracked gasoline product into lower olefin product streams. The olefin separation system 58 may include such systems as absorbers and strippers, fractionators, compressors and separators or any combination of known systems or equipment providing for the recovery and separation of the lower olefin products from a cracked gasoline product. Yielded from the separation system 58 are ethylene product stream, propylene product stream, and butylenes product stream each of which respectively pass from the olefin separation system 58 though conduits 60, 62, and 64. Not shown in FIG. 1 is the one or more olefin manufacturing systems to which any of the lower olefin products may be passed as a polymerization feedstock to be used in the manufacture of polyolefin.

Figure 2:
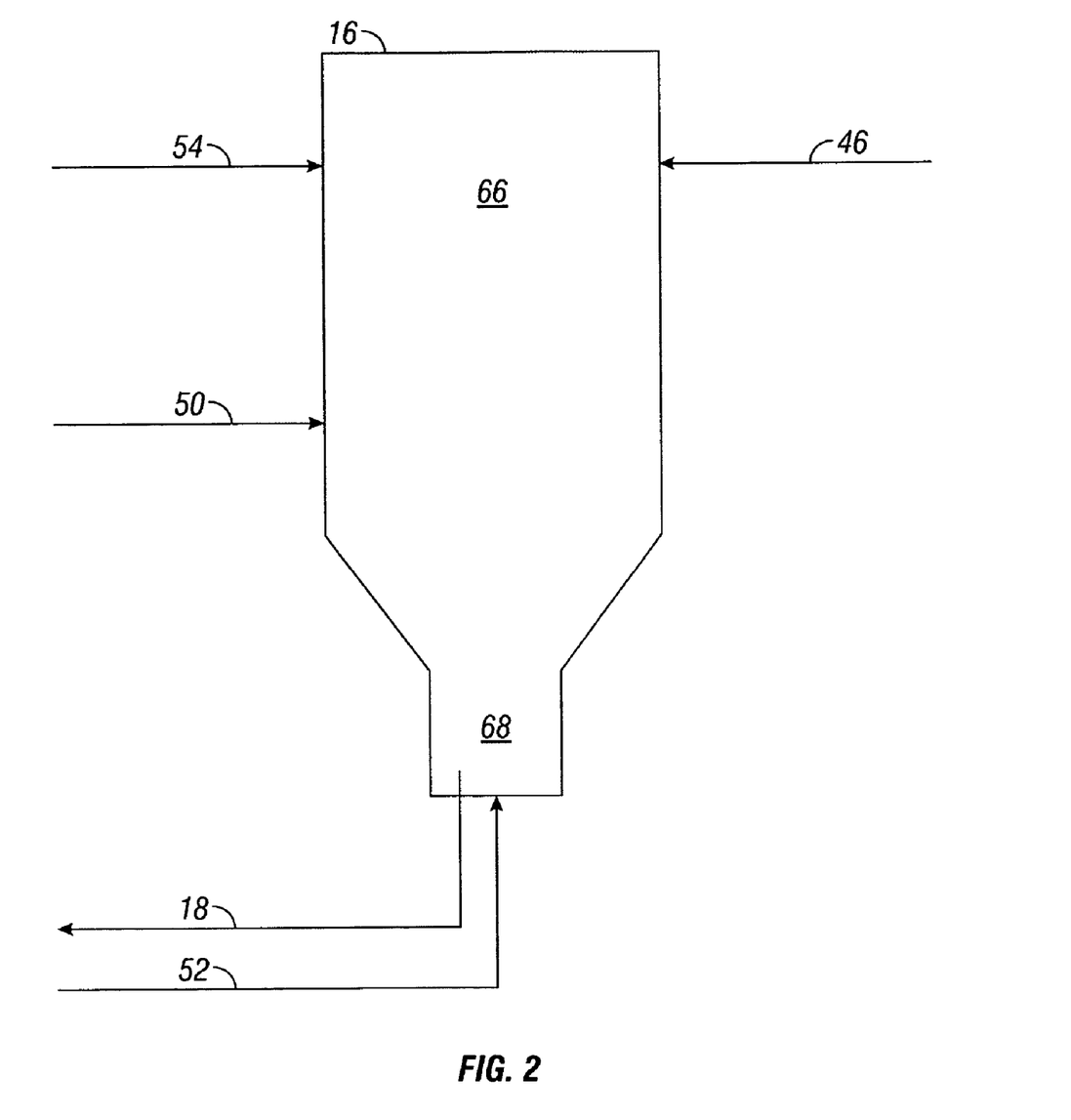
FIG. 2 is a detailed schematic representation of the intermediate cracking reactor system that is one element of the overall process that is depicted in FIG. 1.

FIG. 2 illustrates in somewhat greater detail the dense bed reactor 16. As is shown in FIG. 2, the dense bed reactor 16 is a vessel that defines an intermediate reaction zone 66 and a stripping zone 68. Regenerated catalyst is introduced into the intermediate reaction zone 66 by way of conduit 46, gasoline feedstock is introduced into the intermediate reaction zone 66 by way of conduit 50, and ZSM-5 additive is introduced into the intermediate reaction zone 66 by way of conduit 54. Steam is introduced into the stripping zone 68 by way of conduit 52 and used regenerated cracking catalyst is withdrawn from the stripping zone 68 by way of conduit 18.

The following examples are provided to further illustrate the invention, but, otherwise, they are not to be limiting.

EXAMPLE I

This Example I demonstrates the yield benefits that result from the use of a ZSM-5 additive in combination with a middle distillate selective cracking catalyst in the catalytic cracking of a gasoline feedstock within an intermediate cracking reactor system.

An experimental pilot system was used to conduct the experiments. The pilot system consisted of six sections including a feed supply system, a catalyst loading and transfer system, a riser reactor, a stripper, a product separation and collecting system, and a regenerator. The riser reactor was an adiabatic riser having an inner diameter of from 11 mm to 19 mm and a length of about 3.2 m. The riser reactor outlet was in fluid communication with the stripper that was operated at the same temperature as the riser reactor outlet flow and in a manner so as to provide essentially 100 percent stripping efficiency. The regenerator was a multi-stage continuous regenerator used for regenerating the spent catalyst. The spent catalyst was fed to the regenerator at a controlled rate and the regenerated catalyst was collected in a vessel. Material balances were obtained during each of the experimental runs at 30-minute intervals. Composite gas samples were analyzed by use of an on-line gas chromatograph and the liquid product samples were collected and analyzed overnight. The coke yield was measured by measuring the catalyst flow and by measuring the delta coke on the catalyst as determined by measuring the coke on the spent and regenerated catalyst samples taken for each run when the unit was operating at steady state.

FIGS. 3, 4, 5, and 6 present a summary of the data obtained from conducting the cracking experiments in the aforedescribed experimental pilot system. In these cracking experiments a middle distillate (or diesel) selective cracking catalyst was used in cracking a hydrocarbon feedstock. The comparisons presented in these FIGs. are for a process operation in which the middle distillate selective cracking catalyst was used without any addition of a ZSM-5 additive and for a process operation in which the middle distillate selective cracking catalyst was used with the addition of ten percent ZSM-5 additive.

Figure 3:
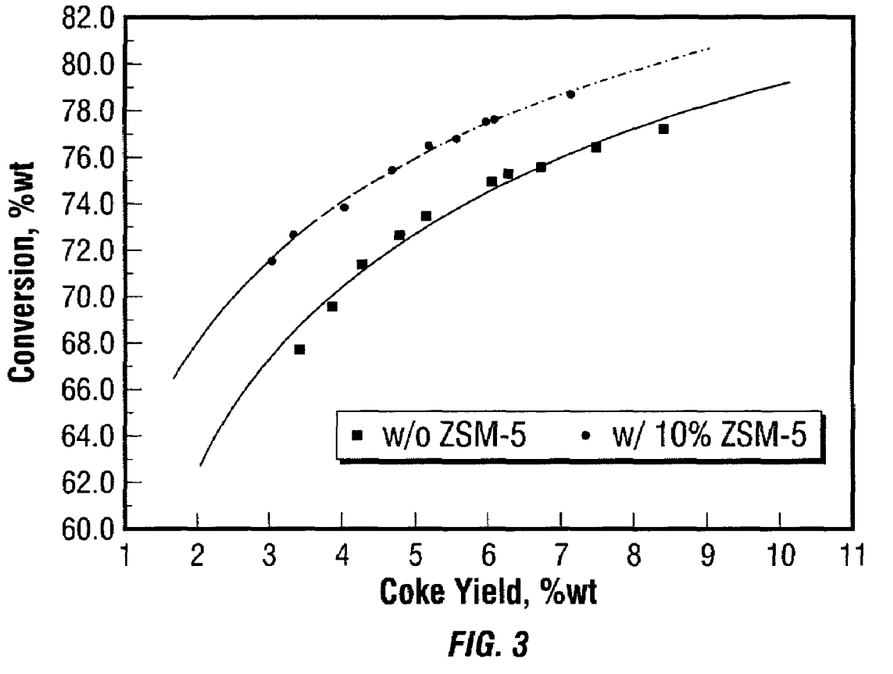
FIG. 3 presents comparison plots showing the coke selectivity (wt. % coke yield versus wt. % feed conversion) resulting from the use of a middle distillate selective cracking catalyst without the addition of ZSM-5 as compared to the use of the middle distillate selective cracking catalyst with the addition of 10 wt. % ZSM-5.

As may be seen from FIG. 3, the process that utilizes the ZSM-5 additive in combination with the middle distillate selective cracking catalyst provides for a better coke selectivity than does the process that utilizes the middle distillate selective cracking catalyst alone without the ZSM-5 additive. Thus, for a given coke yield, the combined use of the middle distillate selective cracking catalyst with the ZSM-5 additive provides a higher percentage conversion of the hydrocarbon feedstock than does the use of the middle distillate selective cracking catalyst alone. Or, in the alternative, for a given hydrocarbon feedstock conversion, the combined use of the middle distillate selective cracking catalyst with the ZSM-5 additive provides for a lower coke yield than does the use of the middle distillate selective cracking catalyst alone.

Figure 4:
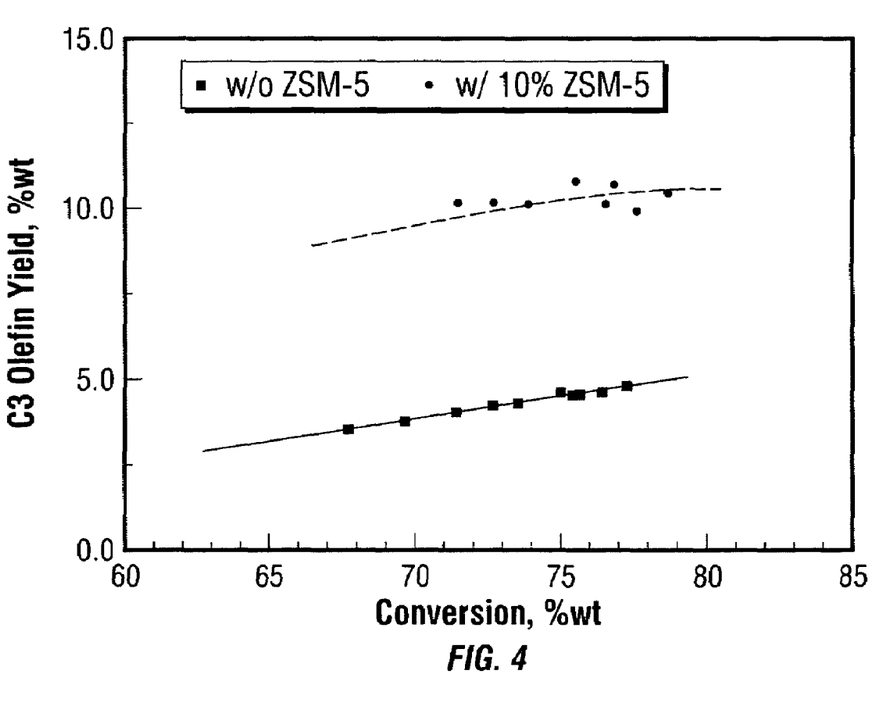
FIG. 4 presents comparison plots showing the propylene yield versus feed conversion resulting from the use of a middle distillate selective cracking catalyst without the addition of ZSM-5 as compared to the use of the middle distillate selective cracking catalyst with the addition of 10 wt. % ZSM-5.
Figure 5:
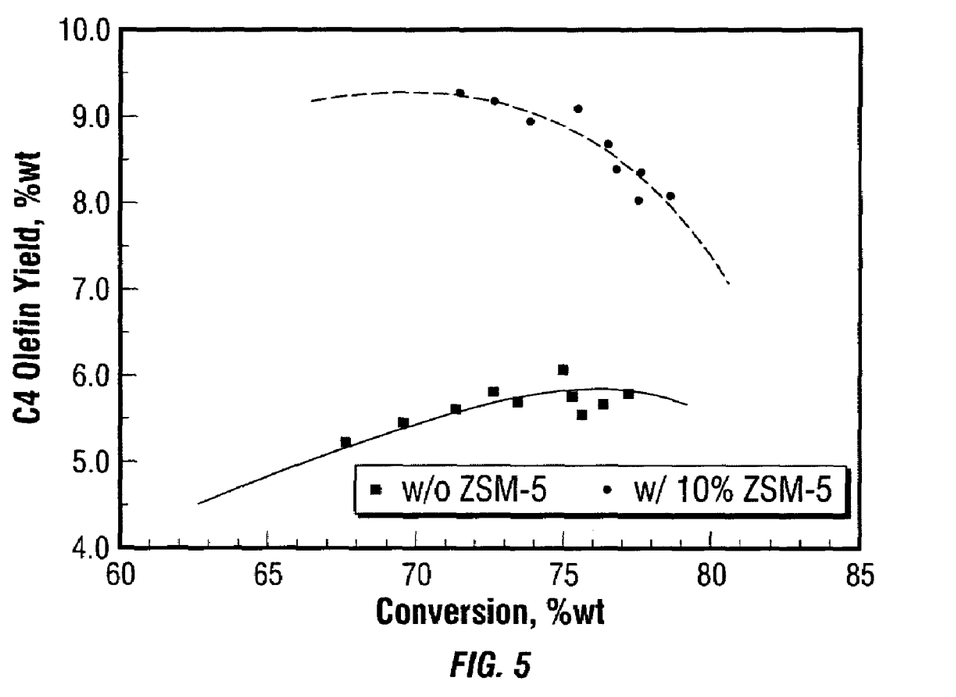
FIG. 5 presents comparison plots showing the butylenes yield versus feed conversion resulting from the use of a middle distillate selective cracking catalyst without the addition of ZSM-5 as compared to the use of the middle distillate selective cracking catalyst with the addition of 10 wt. % ZSM-5.

The summary of data presented in FIG. 4 and FIG. 5 demonstrates the huge improvement in lower olefin yield that results from the combined use of the middle distillate selective cracking catalyst with the ZSM-5 additive in the cracking of a hydrocarbon feedstock. As is shown in both these FIGS., for a given hydrocarbon feedstock conversion, the combined use of the middle distillate selective cracking catalyst with the ZSM-5 additive provides for a significantly greater yield of both propylene and butylenes than does the use of the middle distillate selective cracking catalyst alone.

Figure 6:
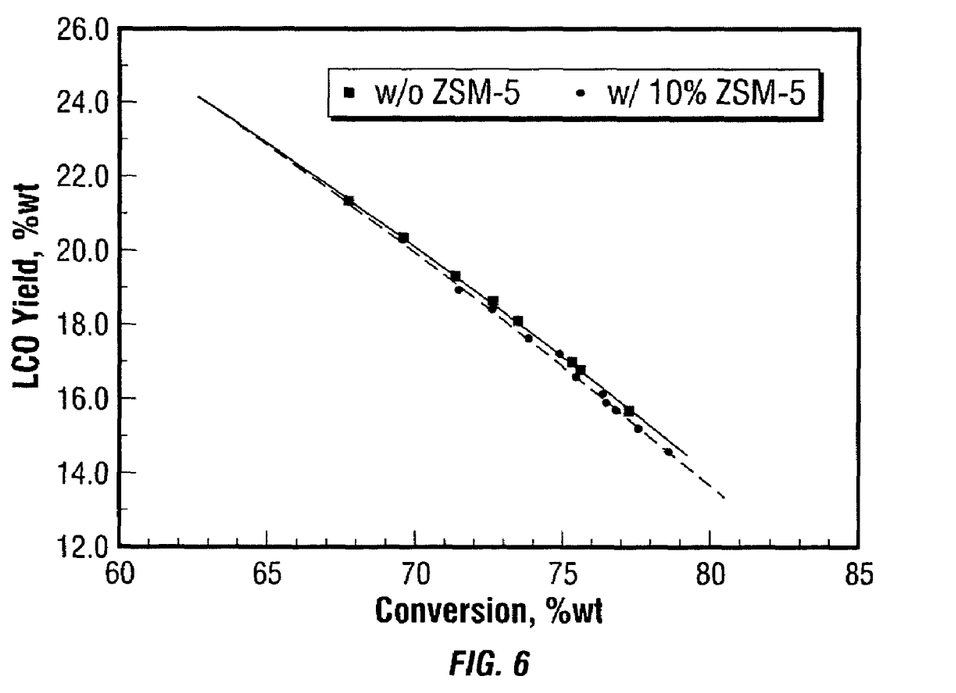
FIG. 6 presents comparison plots showing the light cycle oil yield versus feed conversion resulting from the use of a middle distillate selective cracking catalyst without the addition of ZSM-5 versus the use of the middle distillate selective cracking catalyst with the addition of 10 wt. % ZSM -5.

The summary of data presented in FIG. 6 shows that for a given hydrocarbon feedstock conversion, the combined use of the middle distillate selective cracking catalyst with the ZSM-5 additive has little impact on the yield of light cycle oil as compared to the use of the middle distillate selective cracking catalyst alone. Thus, when it is desired to crack a hydrocarbon feedstock to manufacture a middle distillate product, instead of a gasoline product, and lower olefins, the combined use of a middle distillate selective cracking catalyst with the ZSM-5 additive in an intermediate cracking reactor can provide significant advantages of the use of the middle distillate cracking catalyst alone.

EXAMPLE II

This Example II demonstrates the yield benefits resulting from the use of steam in the catalytic cracking of a gasoline feedstock in an intermediate cracking reactor system utilizing a middle distillate selective cracking catalyst in combination with a ZSM-5 additive.

FIGS. 7, 8, 9, and 10 present a summary of the data obtained from conducting the cracking experiments in the same experimental pilot system describe in the above Example I. In these cracking experiments, a middle distillate (or diesel) selective cracking catalyst was used in combination with a ZSM-5 additive in the cracking a hydrocarbon feedstock. The comparisons presented in these FIGs. are for a process operation in which steam was introduced along with the hydrocarbon feedstock and for a process operation in which no steam was introduced along with the hydrocarbon feedstock.

Figure 7:
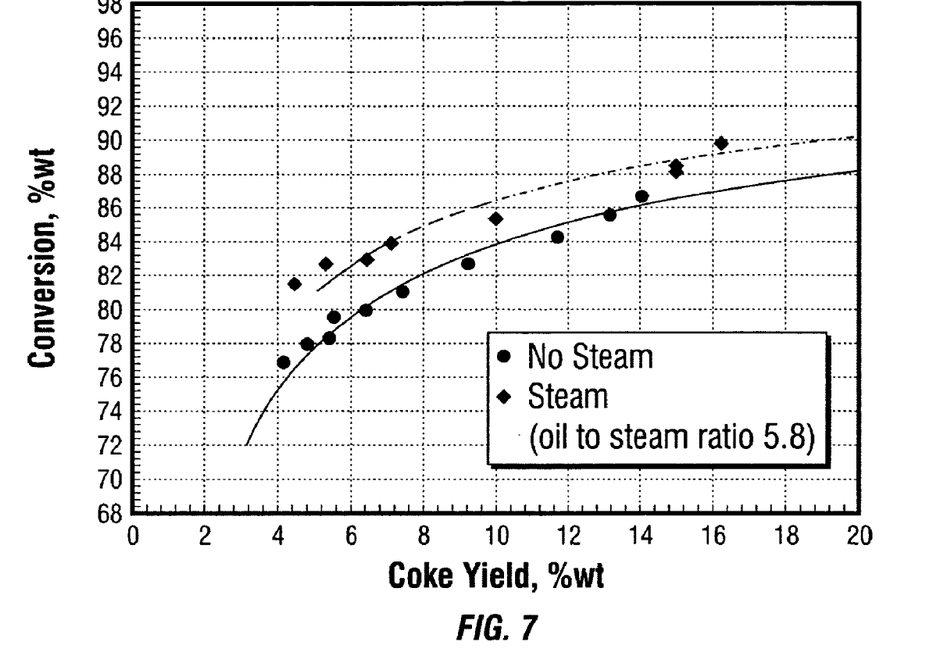
FIG. 7 presents comparison plots showing the coke selectivity resulting from the use of steam with a middle distillate selective cracking catalyst with the addition of 10 wt. % ZSM-5 as compared to the use of no steam with the same middle distillate selective cracking catalyst with the addition of 10 wt. % ZSM-5.

As may be seen from FIG. 7, the process that utilizes steam provides for a better coke selectivity than the process that does not use steam. Thus, for a given coke yield, the use of steam in a cracking process that uses in combination a middle distillate selective cracking catalyst with a ZSM-5 additive provides a higher percentage conversion of the hydrocarbon feedstock than does such a process that does not use steam. Or, in the alternative, for a given hydrocarbon feedstock conversion, the addition of steam with the hydrocarbon feedstock to a cracking process that uses in combination of a middle distillate selective cracking catalyst with the ZSM-5 additive provides for a lower coke yield than does such a process that does not use steam.

Figure 8:
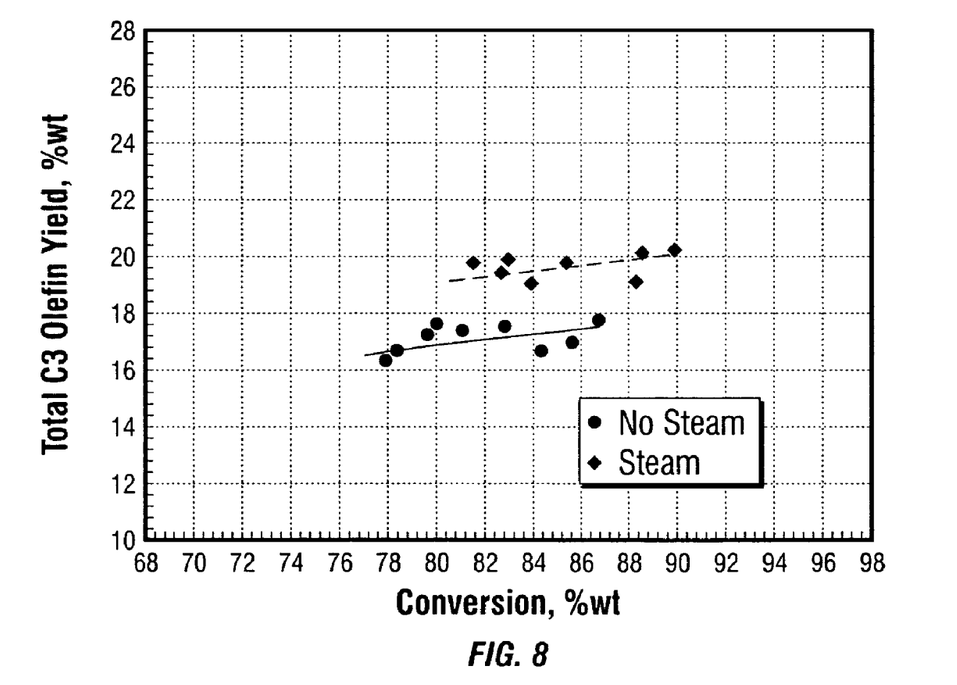
FIG. 8 presents comparison plots showing propylene yield versus feed conversion resulting from the use of steam with a middle distillate selective cracking catalyst with the addition of 10 wt. % ZSM-5 as compared to the use of no steam with the same middle distillate selective cracking catalyst with the addition of 10 wt. % ZSM-5.
Figure 10:
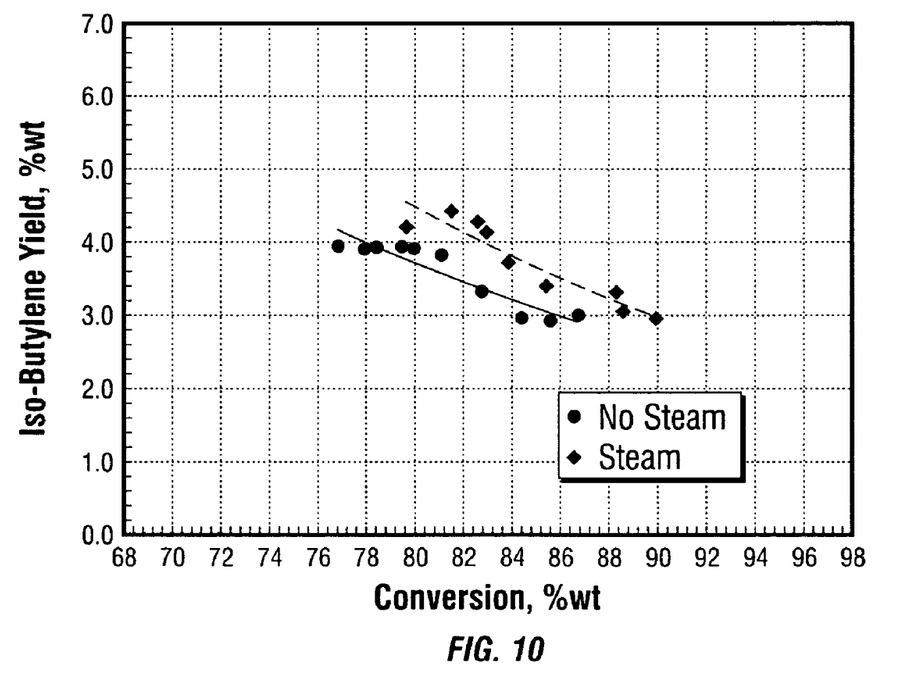
FIG. 10 presents comparison plots showing isobutylene yield versus feed conversion resulting from the use of steam with a middle distillate selective cracking catalyst with the addition of 10 wt. % ZSM-5 as compared to the use of no steam with the same middle distillate selective cracking catalyst with the addition of 10 wt. % ZSM-5.

The summary of data presented in FIG. 8 and FIG. 10 demonstrates the huge improvement in lower olefin yield that results from the use of steam in the cracking of a hydrocarbon feedstock in a process that uses a middle distillate selective cracking catalyst in combination with the ZSM-5 additive. As is shown in both these FIGs., for a given hydrocarbon feedstock conversion, the use of steam provides for a significantly greater yield of both propylene and butylenes than does the process that does not use steam.

Figure 9:
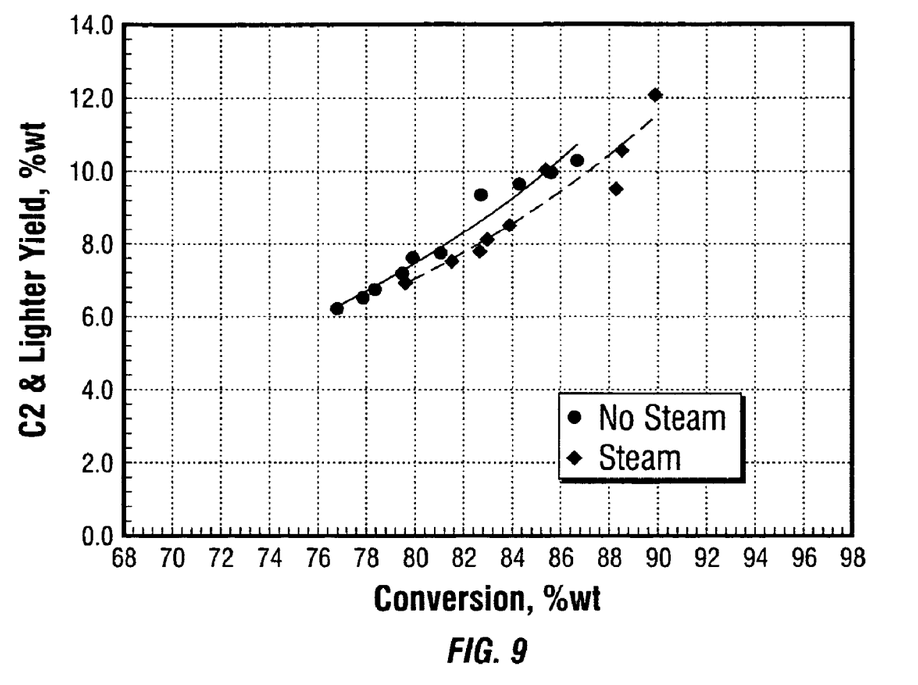
FIG. 9 presents comparison plots showing dry gas yield versus feed conversion resulting from the use of steam with a middle distillate selective cracking catalyst with the addition of 10 wt. % ZSM-5 as compared to the use of no steam with the same middle distillate selective cracking catalyst with the addition of 10 wt. % ZSM-5.

The summary of data presented in FIG. 9 shows that for a given hydrocarbon feedstock conversion, the addition of steam to the hydrocarbon feedstock in a process that uses a middle distillate selective cracking catalyst in combination with the ZSM-5 additive provides for a reduction in the yield of dry gases such as ethane and lighter compounds as compared to the process that does not use steam Reasonable variations, modifications and adaptations can be made within the scope of the described disclosure and the appended claims without departing from the scope of the invention.

That which is claimed is:

1. A process for making middle distillate and lower olefins, said process comprises:
    catalytically cracking a gas oil feedstock within an FCC riser reactor zone by contacting under suitable catalytic cracking conditions within said FCC riser reactor zone said gas oil feedstock with a middle distillate selective cracking catalyst that comprises amorphous silica alumina and a zeolite to yield an FCC riser reactor product comprising middle distillate products and a spent cracking catalyst;
    regenerating said spent cracking catalyst to yield a regenerated cracking catalyst;
    contacting a gasoline feedstock with said regenerated cracking catalyst within an intermediate cracking reactor operated under suitable high severity cracking conditions so as to yield a cracked gasoline product, comprising at least one lower olefin compound, and a used regenerated cracking catalyst;
    separating said cracked gasoline product into a lower olefin product, comprising said at least one lower olefin compound; and
    using said used regenerated cracking catalyst as said middle distillate selective catalyst;
    wherein said middle distillate selective cracking catalyst comprises said alumina in the range from 40 to 65 weight percent; wherein said middle distillate selective cracking catalyst comprises a porous inorganic refractory oxide matrix component having a matrix surface area of from 20 to 90 square meters per gram of said catalyst; and wherein said middle distillate selective cracking catalyst comprises a zeolitic surface area of from 20 to 140 square meters per gram of said catalyst.

2. A process as recited in claim 1, further comprising:
    using said at lower olefin product as an olefin feed to a polyolefin manufacturing system.

3. A process as recited in claim 2, wherein said intermediate cracking reactor defines a intermediate reaction zone and a stripping zone, wherein into said intermediate reaction zone is introduced said gasoline feedstock and said regenerated cracking catalyst and from said intermediate reaction zone is withdrawn said cracked gasoline product, and wherein into said stripping zone is introduced steam and from said stripping zone is withdrawn said used regenerated cracking catalyst.

4. A process as recited in claim 3, further comprising:
    introducing into said intermediate reaction zone a ZSM-5 additive.

5. A process as recited in claim 4, wherein said suitable catalytic cracking conditions are such as to provide for a conversion of said gas oil feedstock in the range of from 40 to 85 weight percent of the total gas oil feedstock.

6. A process as recited in claim 5, wherein said used regenerated cracking catalyst includes a small concentration of carbon.

7. A process, comprising:
    contacting a gas oil feedstock within an FCC riser reactor zone under suitable catalytic cracking conditions with a cracking catalyst and yielding an FCC riser reactor product comprising middle distillate products and a spent cracking catalyst;
    separating said FCC riser reactor product into said middle distillate products and said spent cracking catalyst;
    regenerating said spent cracking catalyst to yield a regenerated cracking catalyst;
    splitting said regenerated cracking catalyst into at least a portion of said regenerated cracking catalyst and a remaining portion of said regenerated cracking catalyst;
    passing said at least a portion of said spent cracking catalyst to an intermediate cracking reactor whereby said at least a portion of said spent cracking catalyst is contacted under suitable high severity cracking conditions with a gasoline feedstock to yield a cracked gasoline product and a used regenerated cracking catalyst;
    using said remaining portion of said regenerated cracking catalyst and said used regenerated cracking catalyst as said cracking catalyst; and
    separating said cracked gasoline product into a lower olefin product comprising at least one lower olefin compound;
    wherein said cracking catalyst comprises alumina in the range from 40 to 65 weight percent; wherein said cracking catalyst comprises a porous inorganic refractory oxide matrix component having a matrix surface area of from 20 to 90 square meters per gram of said catalyst; and wherein said cracking catalyst comprises a zeolite component having a surface area of from 20 to 140 square meters per gram of said catalyst.

8. A process as recited in claim 7, further comprising:
using said at lower olefin product as an olefin feed to a polyolefin manufacturing system.

9. A process as recited in claim 8, wherein said intermediate cracking reactor defines a intermediate reaction zone and a stripping zone, wherein into said intermediate reaction zone is introduced said gasoline feedstock and said regenerated cracking catalyst and from said intermediate reaction zone is withdrawn said cracked gasoline product, and wherein into said stripping zone is introduced steam and from said stripping zone is withdrawn said used regenerated cracking catalyst.

10. A process as recited in claim 9, further comprising:
introducing into said intermediate reaction zone a ZSM-5 additive.

11. A process as recited in claim 10, further comprising:
separating a slurry product from said cracked gas oil product.

12. A process as recited in claim 11, further comprising:
introducing said slurry product to said FCC riser reactor zone.

* * * * *